(12) United States Patent
Dittmann et al.

(10) Patent No.: US 6,978,622 B2
(45) Date of Patent: Dec. 27, 2005

(54) TURBOMACHINE

(75) Inventors: Rolf Dittmann, Nussbaumen (CH);
Jonas Hurter, Baden (CH); Robert Marmilic, Nussbaumen (CH); Pierre Meylan, Magglingen-Macolin (CH); Ernst Pauli, Zürich (CH)

(73) Assignee: ALSTOM Technology Ltd, Baden (CH)

( * ) Notice: Subject to any disclaimer, the term of this patent is extended or adjusted under 35 U.S.C. 154(b) by 35 days.

(21) Appl. No.: 10/830,103

(22) Filed: Apr. 23, 2004

(65) Prior Publication Data

US 2005/0150232 A1    Jul. 14, 2005

Related U.S. Application Data

(63) Continuation of application No. PCT/IB02/04289, filed on Oct. 17, 2002.

(30) Foreign Application Priority Data

Oct. 30, 2001    (CH) .................................... 1990/01

(51) Int. Cl.$^7$ .......................................... F01D 25/12
(52) U.S. Cl. ........................................ 60/782; 60/785
(58) Field of Search ................... 60/782, 785; 415/1, 415/108, 116

(56) References Cited

U.S. PATENT DOCUMENTS

| | | | |
|---|---|---|---|
| 3,793,905 A | 2/1974 | Black et al. ................... | 74/661 |
| 4,854,120 A | 8/1989 | Nelson et al. .............. | 60/39.02 |
| 4,903,477 A | 2/1990 | Butt ........................... | 60/39.37 |
| 5,127,222 A | 7/1992 | Ream et al. ................... | 60/204 |
| 5,212,940 A * | 5/1993 | Glover ......................... | 60/782 |
| 5,605,437 A | 2/1997 | Meylan ...................... | 415/175 |
| 5,967,743 A | 10/1999 | Meylan ...................... | 415/115 |
| 6,422,807 B1 * | 7/2002 | Leach et al. ................... | 41/51 |
| 2001/0022933 A1 | 9/2001 | Bangert et al. ................ | 415/1 |

FOREIGN PATENT DOCUMENTS

| | | |
|---|---|---|
| CH | 245486 | 11/1946 |
| CH | 271215 | 10/1950 |
| DE | 367 109 C | 1/1923 |
| DE | 507 129 C | 9/1930 |
| DE | 857 378 C | 11/1952 |
| DE | 43 24 125 A1 | 1/1995 |
| EP | 0 014 941 A1 | 9/1980 |
| EP | 0 638 727 A1 | 2/1995 |
| EP | 0 838 595 A2 | 4/1998 |
| WO | WO 00/11324 | 3/2000 |

* cited by examiner

*Primary Examiner*—Ehud Gartenberg
(74) *Attorney, Agent, or Firm*—Steptoe & Johnson LLP

(57) ABSTRACT

In order to avoid the "buckling" of multi-shell turbomachine casings during a cooling phase following the shutdown, it is proposed to provide means in order to suitably discharge warm medium which collects at a point of the casing cavity situated at the highest geodetic level. In an embodiment, it is proposed to allow the corresponding lines to open out in the stack of a power plant; the stack draft effect assists the flow even further. Regulating members are advantageously provided in the lines in order to shut off these lines during operation of the turbomachine on the one hand and in order not to arrange the flow through the casing cavities too intensively on the other hand.

14 Claims, 1 Drawing Sheet

TURBOMACHINE

CROSS-REFERENCE TO RELATED APPLICATIONS

This application is a continuation of the U.S. National Stage designation of co-pending International Patent Application PCT/IB02/04289 filed Oct. 17, 2002, the entire content of which is expressly incorporated herein by reference thereto.

FIELD OF THE INVENTION

The present invention relates to a turbomachine.

BACKGROUND OF THE INVENTION

The phenomenon of the "buckling" of the rotor and of the casing of turbomachines such as gas turbines and steam turbines is sufficiently known. It is caused by the large and high-mass structures of such machines having stored large quantities of heat after prolonged operation. During the cooling, a pronounced vertical thermal stratification occurs in the comparatively large flow passages, this thermal stratification leading to nonuniform temperature distributions in the static and the rotating components, which, on account of the different thermal expansions, results in a distortion of casing and rotor and in deviations from the rotationally symmetrical desired geometry. As a result, with the unavoidably small gap dimensions in modern turbomachines, jamming of the rotor in the casing occurs, which inhibits the start-up availability and in addition is capable of putting the mechanical integrity at risk. Shaft-turning systems or also "shaft-indexing" systems have therefore been disclosed, for example, by U.S. Pat. No. 3,793,905 or U.S. Pat. No. 4,854,120. In this case, the rotor of a turbomachine continues to be rotated at a certain speed after the shutdown. Here, as in the known shaft indexing, low speeds within the region of 1 rev/min and lower are preferred. On the one hand, this is sufficient in order to make the cooling of the rotor more uniform in the circumferential direction; on the other hand, the speed is low enough in order not to cause any pronounced axial flow through, for instance, the hot-gas path of a gas turbine with associated cold-air input and thermal shocks.

In the section subjected to high temperatures, modern gas turbines are often constructed with twin-shell casings. In this case, an annular space, to which cooling air or other coolant is often admitted during operation, is formed between an inner casing and an outer casing. A vertical thermal stratification which leads to distortion of the casings forms in the annular space without further measures after the gas turbine has been shut down.

DE 507 129 and WO 00/11324 propose to provide means in a twin-shell casing of a turbomachine in order to disturb the stable thermal stratification when the turbomachine is at rest by a forced flow inside the intermediate space. In this case, it is essentially proposed to deliver medium outside the annular space from one point of the annular space to another point of the annular space, as a result of which a compensating flow is induced inside the annular space. The system proposed there, however, is an active system which has to rely on a blower for its functioning. However, a system which is intended to avoid the buckling of the casing and thus grazing of the blades of a turbomachine must be regarded as a safety system, which should work as passively as possible without having to rely on the functioning of active components.

DE 367 109 discloses a passive system for the flow of cooling air through components of an internal combustion engine. However, this is designed for convection optimization and is therefore already not suitable for fulfilling the present task, since importance is attached to convection optimization, a factor which in the present case entails undesirable thermal shocks. EP 0 014 941 specifies a system for passive ventilation in an intermediate space formed between two casing shells. To avoid thermal shocks, however, no pronounced flow through the casing cavity is to be produced in this case, but rather the formation of pronounced vertical thermal stratifications is merely to be avoided. Furthermore, the systems presented in DE 367 109 and EP 0 014 941 have no means of eliminating disturbing effects on the requisite flows which are present in the turbomachine casing cavities considered and are optimized in a complicated manner.

SUMMARY OF THE INVENTION

The invention specifies a turbomachine of the type mentioned at the beginning which avoids the disadvantages of the prior art. In particular, a turbomachine is to be specified in which an arrangement for avoiding the formation of stable thermal stratifications in stator cavities and for avoiding the buckling of the casing is provided in an inherently safe manner, without active components.

The essence of the invention is therefore to provide means in order to discharge the respectively warmest fluid from the cavity and in this way prevent the formation of marked temperature stratifications. In this case, the outflowing fluid must of course be replaced by an inflowing fluid. The means for discharging the warmest fluid are arranged at a point of the cavity situated at the highest geodetic level, so that a stack draft effect, as it were, occurs and this stack draft effect enables the flow to be maintained without active components. The system is therefore inherently safe. At the same time, fluid at the maximum temperature is discharged, as a result of which the entire temperature difference present is already reduced per se. The means for discharging fluid and the means for feeding the compensating flow form together with the cavity a flow path. It is important for the invention that a shutoff member be provided, this shutoff member enabling the flow path to be shut off. It is thus possible to shut off the completely passively realized casing ventilation during the operation of the turbomachine, during which it can even be very damaging, and to open up the flow path again immediately after the shutdown, that is to say after the end of operation.

In this case, it is in no way the aim of the invention to realize a casing ventilation with coolant per se, but rather the intention is to discharge from the casing cavity only the respectively warmest fluid collecting at the point situated at the highest geodetic level, in the course of which a corresponding compensating flow is to be realized in a positive manner. With this simple measure, highly pronounced thermal stratifications can be avoided without at the same time causing rapid casing cooling, which is detrimental to the reliability of the warm start, by the input of cold air, as is the case in the prior art. The ventilation of the cavity can accordingly also be carried out intermittently, in particular when a device for measuring the thermal stratification is available. The shutoff member can then be opened and closed like a two-point control in such a way that, if a limit value of the measured thermal stratification—in the simplest case as temperature difference between two points of different geodetic height—is exceeded, the shutoff member is opened and thus the purely passively convection-driven ventilation is activated, and, if a lower limit value is exceeded, the shutoff member is closed again.

The shutoff member is advantageously a shutoff and throttle member which not only enables the flow path to be completely opened up or shut off but also allows variable throttling of the flow path and thus of the ventilation flow. On the one hand, this enables the flow path to be closed during operation of the machine; on the other hand, the intensity of the ventilation can be set, for example, as a function of a temperature distribution measured inside the cavity. If a large temperature difference is measured inside the cavity at least at two measuring points which are arranged at different geodetic levels, this means a pronounced thermal stratification, and the throttle member is accordingly opened in order to intensify the ventilation. If, conversely, a small thermal stratification which is below a limit value to be established from case to case is measured, the throttle member is closed further and the flow through the cavity is reduced. In this way, inadmissible thermal stratifications inside the casing, combined with casing distortions, are avoided on the one hand, and cooling which is too rapid is avoided on the other hand, which is beneficial for the reliability of the warm start.

It is advantageous if the inflowing fluid for compensating for the outflowing fluid is preheated prior to being introduced into the cavity. This results in the entire casing cooling taking place more slowly, which reduces the loading of the casing on the one hand and improves the safety and reliability of the warm start on the other hand. Means for preheating the compensating fluid are therefore provided upstream of the point at which this compensating fluid is introduced into the cavity. These means, for example, may consist in the fluid flowing over or through other hot components, such as the rotor or a combustion space of a gas turbine, and absorbing heat in the process. In a multiplicity of possible flow guides, this condition is fulfilled anyway or can be fulfilled with only slight modifications.

The invention proves to be especially suitable in particular when the cavity is formed, for example, between a wall of a combustion space and an outer cylinder of a gas turbine, the cavity often having an annular or a ring-segment-shaped cross section. If the invention is realized in a gas turbine, it also proves to be favorable to connect the means for discharging fluid to the exhaust-gas duct and to connect the means for feeding fluid to the cooling system.

BRIEF DESCRIPTION OF THE DRAWINGS

The invention is to be explained in more detail below with reference to the drawing.

DETAILED DESCRIPTION OF THE PREFERRED EMBODIMENTS

Figure 1:
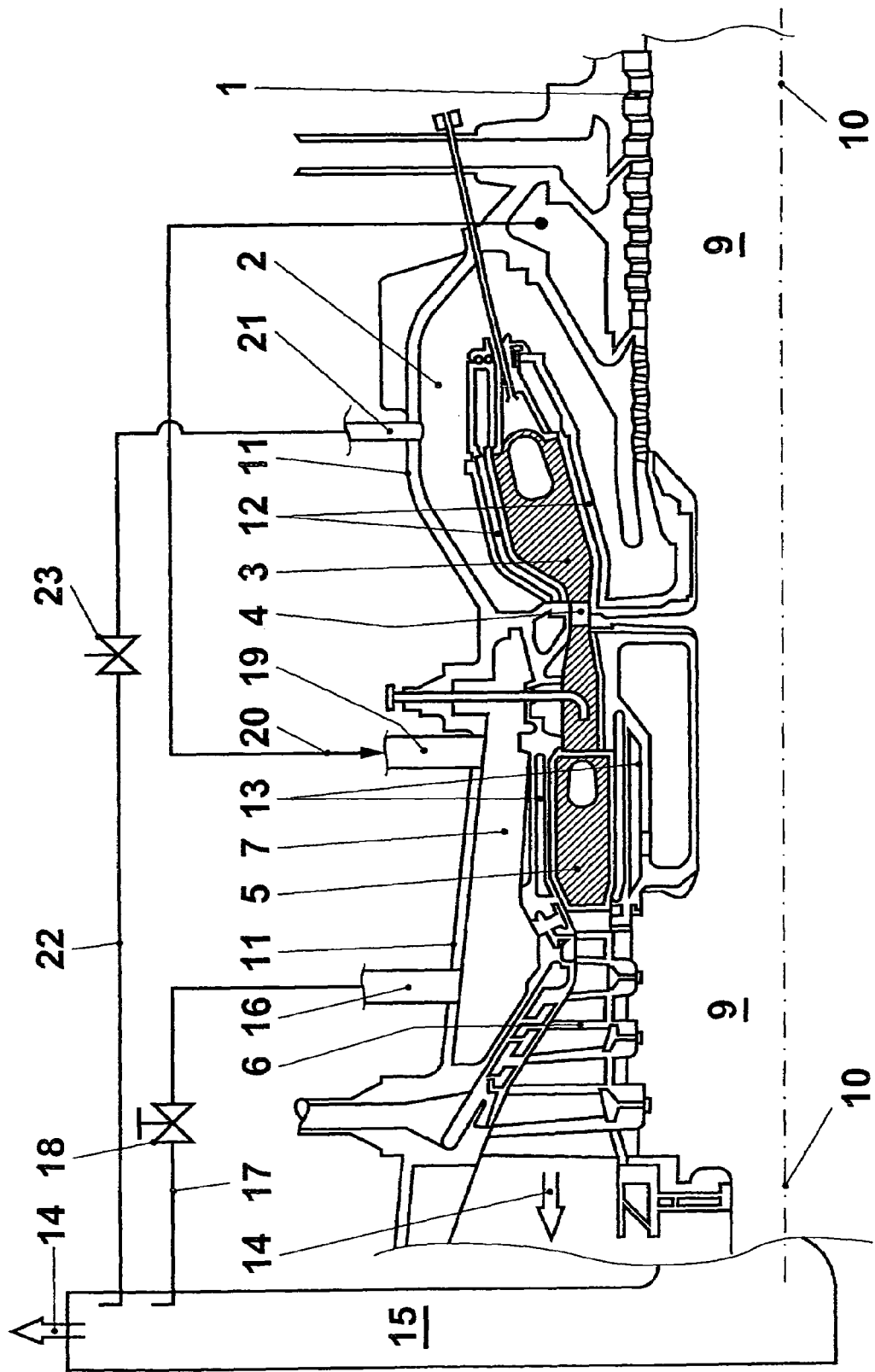
FIG. 1 shows part of a thermal block of a gas turbine in which the invention is realized.

The invention is to be explained in the context of a turbomachine. The thermal block of a gas turbine is illustrated in the drawing, only the part above the machine axis 10 being shown. The machine shown in the drawing is a gas turbine having "sequential combustion", as disclosed, for example, by EP 620362. Although its functioning is not of primary significance for the invention, this may be explained in broad outline for the sake of completeness. A compressor 1 draws in an air mass flow and compresses it to a working pressure. The compressed air flows through a plenum 2 into a first combustor 3. A fuel quantity is introduced there and burned in the air. The hot gas produced is partly expanded in a first turbine 4 and flows into a second combustor, an "SEV combustor". The fuel supplied there ignites on account of the still high temperature of the partly expanded hot gas. The reheated hot gas is expanded further in a second turbine 6, in the course of which mechanical output is transmitted to the shaft 9. The expanded hot gas 14 flows through an exhaust-gas duct, which is indicated by a stack 15. Of course, this exhaust gas, before flowing off through a stack, can also flow through means for utilizing the exhaust-gas heat, for example a heat-recovery steam generator.

During operation, temperatures of several 100° C. already prevail in the last compressor stages, and even more so in the region of the combustors 3, 5 and in the turbines 4, 6. After such a machine has been shut down, the large masses—for example a mass of the rotor 9 of 80 tonnes—store a large quantity of heat for a prolonged period of time. During cooling when the machine is at rest, a pronounced vertical thermal stratification occurs in fluid-filled cavities of the machine. This leads to the top and bottom parts of casing and rotor cooling down at different rates, as a result of which distortion of the components occurs, which is referred to as "buckling".

In a view toward the region of the second combustor 5 of the gas turbine shown, a cavity 7 in the shape of a ring torus is formed between a combustor wall 13 and the outer shell 11 of the gas turbine. During operation of the gas turbine, a forced flow of branched-off cooling air delivered by the compressor passes through said gas turbine. During the cooling phase, heat is introduced into the cavity via the combustor wall 13 and is dissipated via the outer shell 11. A free convection flow occurs in the cavity parallel thereto, as a result of which warm fluid collects in the top part of the cavity without further measures, whereas colder fluid is located in the bottom part of the cavity. For this reason, the gas turbine shown, at a point situated at the highest geodetic level, has first means 16 for discharging fluid from the cavity, and second means 19 for feeding a fluid 20 as compensating flow for the warm fluid discharged through the first means 16. The second means 19 are likewise arranged at a top position of the cavity but are axially at a significant distance from the first means for discharging fluid. This arrangement has the advantage that a comparatively cool compensating medium 20, on account of the difference in density, first of all flows into the bottom part of the cavity in order to be heated there and to rise again. Furthermore, the axially spaced-apart positions of the means for feeding and discharging fluid also result in an axial flow through the cavity in such a way that the cavity is ventilated as completely as possible, as a result of which the formation of a pronounced thermal stratification is finally prevented. Arranged to start from the first means 16 for discharging the warm fluid is a schematically shown line 17, which opens out in the stack 15 or at another suitable point of the exhaust-gas duct of the gas turbine. The stack draft effect in the exhaust-gas duct effectively assists the discharge of the warm fluid from the cavity. Arranged in the line 17 is a shutoff and throttle member 18. The latter is closed during operation of the gas turbine and open when it is at rest. In this case, the ventilation intensity inside the cavity can be influenced by defined throttling. In particular, it is advantageous if the ventilation intensity is restricted to a value at which the formation of pronounced thermal stratifications is certainly avoided on the one hand, but rapid casing cooling is avoided on the other hand. If need be, corresponding shutoff and throttle members may also be provided in the fluid feed line to the second means 19. In the present example, the cooling-air system through which cooling air flows into the cavity 7 during operation is used for the feed of the compensating flow. For safety reasons, no shutoff members are provided in the cooling system. The fluid 20 provided as compensating flow corresponds during operation to the intermediate-pressure cooling air and is extracted from the compressor 1. In this case, the fluid has passed through a plurality of compressor stages and has absorbed heat from the structures of the compressor; it is therefore perfectly correct to talk of means for preheating the fluid being arranged in the flow path, even though no specific heat exchanger is provided. When the fluid is correspondingly directed toward the means 19, the flow path for the compensating fluid can of course be directed via dedicated heat exchangers. Formed in the region of the first combustor between the combustor dome 12 and the gas turbine shell 11 is the plenum 2, which likewise has an annular cavity in which a damaging thermal stratification is able to appear. Combustion air flows through the plenum 2 during operation of the gas turbine. Here, too, means 21 through which heated medium is able to flow off are arranged at a geodetically upper point. These means are connected to a line 22 likewise directed into the exhaust-gas duct 15 and are in operative connection with a shutoff and throttle member 23 in the manner described above. The outlet of the compressor 1 functions directly as a means of feeding a compensating fluid in this case. The inflowing fluid, prior to flowing toward the cavity 2, has flowed through the entire compressor 1 and has absorbed heat from the hot structures of the compressor stages, which after prolonged full-load operation have, for example, temperatures of 400° C. and above. In this case, therefore, these compressor stages function as means for preheating the fed fluid.

The arrangement of the second means for feeding the compensating fluid is not established according to the invention and must be expediently selected from case to case by the person skilled in the art.

The invention is in no way restricted to use in the cavities 2, 7 lying furthest on the outside. Given a suitable design of the means, the invention may likewise be realized in the combustors 3, 5 or in the space formed between the casing elements 12, 13 and the shaft 9.

The invention is likewise not restricted to use in annular cavities.

The person skilled in the art will readily recognize that the use of the invention is in no way restricted to gas turbines but that the invention may be used in a multiplicity of further applications. Of course, the use of the invention is also not restricted to a gas turbine shown in the drawing and having sequential combustion, but rather the invention may also be used in gas turbines having only one combustor or more than two combustors. In particular, the invention as characterized in the claims may also be realized in steam turbines.

What is claimed is:

1. A turbomachine comprising at least one cavity between an inner casing and an outer casing of the turbomachine, said cavity comprising first means for discharging fluid from the cavity and second means for feeding fluid into the cavity, said first and second means being arranged proximate a highest geodetic level of the cavity, the cavity together with the first and the second means forming a flow path, and at least one shutoff member being disposed in the flow path and permitting the flow path to be completely shut off.

2. The turbomachine of claim 1, wherein the shutoff member is disposed in the means for discharging fluid.

3. The turbomachine of claim 1, wherein the shutoff member is a combined shutoff and throttle member that permits the flow path to be either shut off or throttled in a variable manner.

4. The turbomachine of claim 1, further comprising preheating means for preheating fluid fed to the cavity and being disposed upstream of where the fluid is fed into the cavity.

5. The turbomachine of claim 1, wherein the cavity has a form selected from the group consisting of a substantially annular-shaped cross-section and a ring-segment-shaped cross-section.

6. The turbomachine of claim 1, wherein the turbomachine is a gas turbine.

7. The turbomachine of claim 6, wherein the inner casing is selected from the group consisting of a combustor plenum and a combustor wall of the gas turbine, and the outer casing is an outer shell of the gas turbine.

8. The turbomachine of claim 6, wherein the first means for discharging fluid are connected via a line to an exhaust-gas duct of the gas turbine.

9. The turbomachine of claim 6, wherein the second means for feeding fluid are connected to a cooling system of the gas turbine.

10. A method for operating a turbomachine comprising at least one cavity between an inner casing and an outer casing of the turbomachine, said cavity comprising first means for discharging fluid from the cavity and second means for feeding fluid into the cavity, said first and second means being arranged proximate a highest geodetic level of the cavity, the cavity together with the first and the second means forming a flow path, and at least one shutoff member being disposed in the flow path and permitting the flow path to be completely shut off, the method comprising:

keeping the shutoff member closed during operation of the turbomachine; and opening the shutoff member when the turbomachine is at standstill.

11. The method of claim 10, wherein the shutoff member is alternately opened and closed when the turbomachine is at standstill.

12. The method of claim 11, wherein the shutoff member is opened and closed as a function of a thermal stratification measured in the cavity.

13. The method of claim 10, further comprising throttling the flow path in a variable manner as a function of a temperature distribution measured inside the cavity.

14. The method of claim 10, wherein the shutoff member is opened during a cool-down phase of the turbomachine after operation thereof.

\* \* \* \* \*